United States Patent [19]

Kawamura

[11] Patent Number: 5,603,298

[45] Date of Patent: Feb. 18, 1997

[54] HIGH COMPRESSION RATIO INTERNAL-COMBUSTION ENGINE

[75] Inventor: Hideo Kawamura, Samukawa-machi, Japan

[73] Assignee: Isuzu Ceramics Research Institute Co., Ltd., Kanagawa, Japan

[21] Appl. No.: 548,254

[22] Filed: Oct. 25, 1995

Related U.S. Application Data

[63] Continuation of Ser. No. 304,808, Sep. 12, 1994, abandoned, Continuation-in-part of Ser. No. 120,349, Sep. 14, 1993, abandoned.

[30] Foreign Application Priority Data

| Sep. 14, 1992 | [JP] | Japan | 4-271071 |
| Sep. 29, 1992 | [JP] | Japan | 4-283741 |
| Nov. 11, 1992 | [JP] | Japan | 4-326055 |

[51] Int. Cl.⁶ .................................................. F02B 19/02
[52] U.S. Cl. ........................................ 123/254; 123/292
[58] Field of Search .................................. 123/254, 255, 123/270, 292

[56] References Cited

U.S. PATENT DOCUMENTS

| 4,300,497 | 11/1981 | Webber | 123/292 X |
| 4,372,264 | 2/1983 | Trucco | 123/292 X |
| 4,424,780 | 1/1984 | Trucco | 123/292 X |
| 4,854,281 | 8/1989 | Hareyama et al. | 123/292 |
| 5,054,443 | 10/1991 | Kawamura | 123/292 X |
| 5,178,109 | 1/1993 | Kawamura | 123/292 |

*Primary Examiner*—Tony M. Argenbright
*Attorney, Agent, or Firm*—Staas & Halsey

[57] ABSTRACT

The present invention relates to a high compression ratio internal-combustion engine including a control valve which opens and closes a connection hole, between a pre-chamber and a main chamber, which pre-burns fuel and main chamber. The engine controls the fuel injection and the opening and closing of the control valve according to the rotation of the crank shaft and engine load. The connection hole is opened during the exhaust step or at the last period of compression stroke near top dead center and compressed hot air is forced into t he pre-chamber. The fuel is then mixed and burned by the hot air, but the fuel air mixture in the pre-chamber is so rich that the generation of NOX is controlled. Afterwards, the non-burned fuel and flame generated in pre-chamber is ejected to the main chamber, and fuel and hot air in the main chamber react. The engine of the present invention allows smooth engine operation even at a high compression ratio.

12 Claims, 4 Drawing Sheets

HIGH COMPRESSION RATIO INTERNAL-COMBUSTION ENGINE

This application is a continuation of application Ser. No. 08/304,808, filed Sep. 12, 1994, now abandoned, which is a continuation-in-part of Ser. No. 08/120,349, filed Sep. 14, 1993, now abandoned.

BACKGROUND OF THE INVENTION

FIELD OF THE INVENTION

This invention relates to a high compression ratio internal-combustion engine which locates the control valve in sub-chamber.

The higher compression ratio ($\epsilon$) usually leads to increased performance of the engine.

Therefore, the gasoline engine drives the compression ratio at about 8–10.

The engine cannot demonstrate enough performance when this compression ratio is further increased, generating a knock in the combustion cylinder of the engine.

In a diesel engine, the fuel is ejected into the air, compressed in the combustion cylinder and burns.

Therefore, the diesel engine increases the compression ratio to about 18–23 and improves the performance.

The gasoline engine mixes the fuel with air and makes a so-called pre-mixture beforehand, outside the engine and injects this in the cylinder as described.

When the compression ratio of the gasoline engine is raised to more than 8–10 and the temperature of the compressed air in the combustion cylinder is raised. Furthermore, the pre-mixture gas injected into the combustion cylinder ignites and a knock is generated, before the spark is ignited.

It is difficult for the gasoline engine to improve the compression ratio more than an old value.

The fuels of the engine are the fossil fuels such as gasoline, light oil and natural gas.

When these fossil fuels are used for the fuel of the engine, a lot of materials which pollute the atmosphere such as nitrogen oxide and soots are included in exhaust gas.

The engine which burns methanol can be developed which creates little pollution.

As mentioned above, the content of soot and the nitrogen oxide in exhaust gas decreases when the methanol is used for the fuel of the engine.

When the load of the engine is high, a lot of problems are not caused. However, with a low engine load, the wall temperature of the combustion cylinder decreases because the latent heat of evaporation of the methanol is large and the ignition temperature is high.

Therefore, evaporation and the activation of the methanol become difficult and the combustion cylinder of the engine is not burnt smoothly.

SUMMARY OF THE INVENTION

In view of the aforesaid drawbacks of the conventional internal-combustion engines, it is an object of the invention to provide a high compression ratio internal-combustion engine, even if the compression ratio of the air of the engine is increased, these problems are not caused.

It is another object of the invention to provide a high compression ratio internal-combustion engine, wherein even if the compression ratio of the air of the engine is increased and methanol fuel is used, these problems are not caused.

It is furthermore an object of the invention to provide a high compression ratio internal-combustion engine, by installing a connection passage where the upper part of pre-chamber is connected to the top part of main chamber and providing a control valve which is installed between the main chamber and the pre-chamber which may be opened easily.

According to the present invention, there is provided a high compression ratio internal-combustion engine comprising a control valve installed between a pre-chamber and main chamber, a driver for said control valve, an injection nozzle for injecting a fuel into said pre-chamber, means for controlling the position of said control valve to close during the exhaust step and intake step and to open during the last stage of compression step, and means for controlling said injection nozzle for injecting fuel into the pre-chamber during said exhaust step.

In addition, the pre-chamber of this invention has a heat insulated structure. Therefore, the inside of pre-chamber can be maintained at a high temperature. Moreover, the control valve is installed in the connection hole between the main chamber and pre-chamber. As for the engine of this invention, the control valve is closed at the end of the exhaust step or the expansion step and the fuel is injected afterwards.

The fuel injected into the pre-chamber becomes a mixture which is activated inside of the pre-chamber by the high temperature. The combustion is not done too rapidly, so that the fuel reacts with the small amount of oxygen which remains in the pre-chamber, therefore, generation of NOX is minimized.

When the control valve is opened at the end of the compression step, the mixture expands from the pre-chamber to the main chamber through the connection hole. The mixture reaching the main chamber burns explosively, because the mixture is activated and is reacted with a large amount of air.

According to the present invention, there is provided a high compression ratio internal combustion engine having: a control valve installed between a pre-chamber and a main chamber, an electromagnetic driver for said control valve comprising: an injection nozzle having a main injection hole and subinjection hole for injecting a fuel to said pre-chamber, means for controlling said control valve to close the valve during the exhaust step and the intake step and to open the valve during the last stage of the compression step, and means for controlling said injection nozzle for injecting a fuel into the pre-chamber during said exhaust step, and a connection passage which connected between an upper part of pre-chamber and a main chamber.

This engine has a connection passage between an upper art of the pre-chamber and the main chamber. During the step of injecting the fuel, the fuel is injected from the subinjection hole of nozzle to contact air from the connection passage, and the fuel is burned. The pressure in the pre-chamber increases. The control valve is pressurized to open the valve, such that the valve can open easily without a large force applied thereto. When the control valve is opened at the end of the compression step, the mixture expands from the pre-chamber to the main chamber through the connection hole. As the mixture reaches the main chamber it burns explosively.

DETAILED DESCRIPTION OF THE PREFERRED EMBODIMENTS

Figure 1:
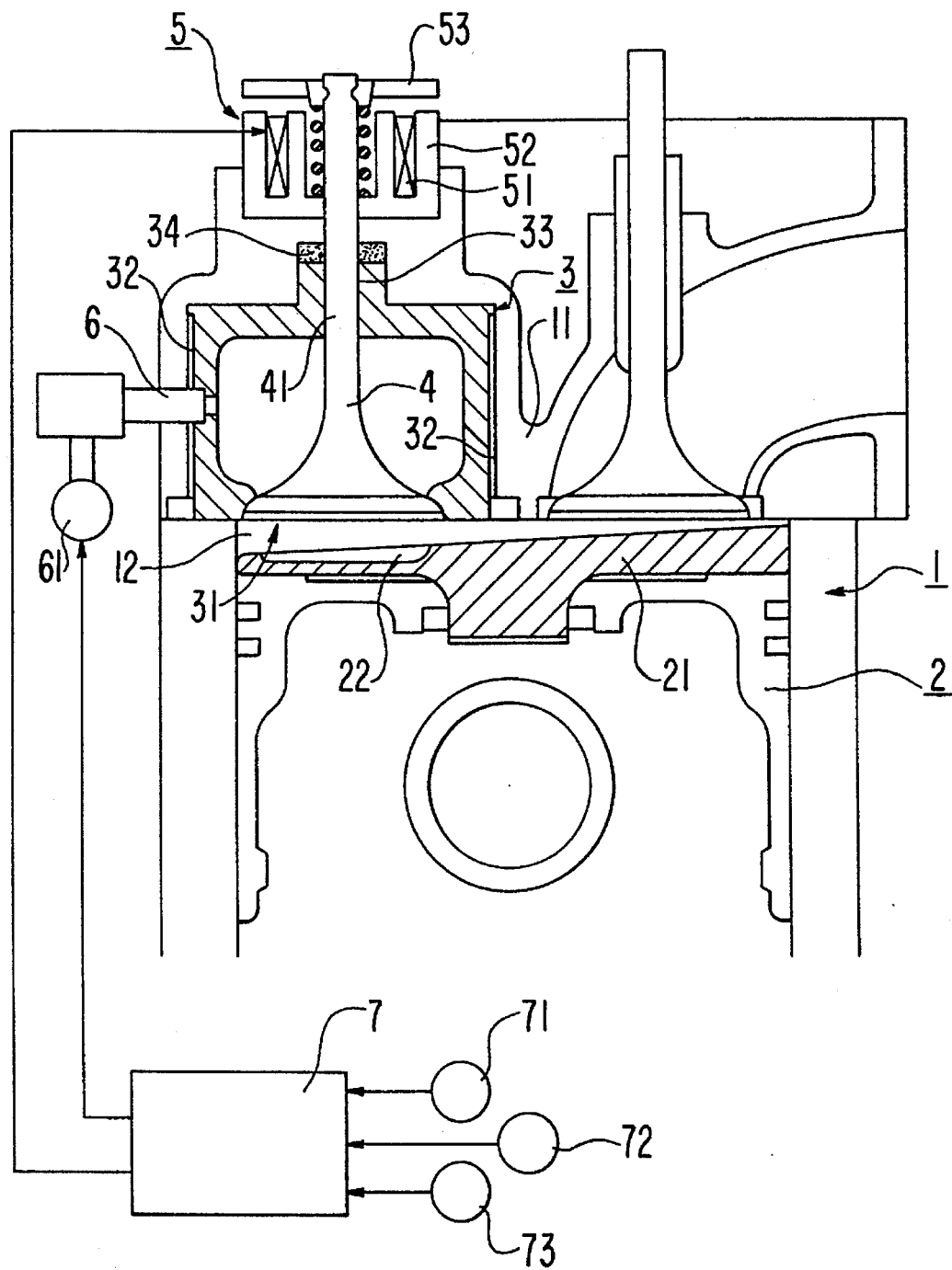
FIG. 1 is a fragmentary cross-sectional view of the first embodiment of this invention.

FIG. 1 is a fragmentary cross-sectional view of the first embodiment of the high compression ratio engine of this invention.

In the FIG. 1, the cylinder 1 has a piston 2 which can be moved up and down in this cylinder 1. There are installed an inlet valve or an exhaust valve 4 and pre-chamber 3 which serves as a precombustion chamber in cylinder head 11. The material which composes piston head 21 is ceramic which has heat resistance and high strength. A slope is formed on the piston head 21 and the portion under the pre-chamber has the lowest position. The slope is shallowly formed while going away from the portion under the pre-chamber. There is a hollow part 22 on the slope of piston head 21. The hollow part 22 operates as an accumulator of air.

The pre-chamber 3 is composed of a high strength, heat resistant, and heat insulation material, for example, silicon nitride.

Air layer 32 of heat insulation is formed on the outer wall of pre-chamber 3, connection hole 31 connected with main chamber 12 is formed in a central part of pre-chamber 3, and control valve 4 which opens and closes the connection hole 31 is installed on it. The connection hole 31 has a cross-sectional area equal to approximately 3–5% of the cross-sectional area of the piston head.

Stem 41 of this control valve 4 is slidably supported in an axis hole 33 which penetrates a central upper part of the wall of pre-chamber 3. Therefore this control valve 4 moves in the direction of the axis of stem 41 by the vertical motion.

A heat insulation material 34 is installed above axis hole 33 to prevent heat in the pre-chamber from running away from step 41 of the control valve 4.

An electromagnetic device 5 such as a solenoid is installed above stem 41 for the opening and closing of control valve 4.

When the electric current is thrown into coil 51 of the electromagnetic device 5, core 52 is pulled down to shock adsorption board 53 installed on step 41 and moves control valve 5 below. Control valve 3 opens connection hole 31 of pre-chamber 3. The injection nozzle 6 is installed on the sidewall of pre-chamber 3. The fuel, sent from a fuel tank, in injected into the pre-chamber 3 from injection nozzle 6.

The fuel injection instruction of this fuel injection pump 61 is commanded by controller 7. The controller 7 comprises a microcomputer. A detection signal from rotation sensor 71, load sensor 72, and crank axis position sensing device 73 of the engine is input to the controller 7. Based upon these detection signals input to controller 7, a fixed operation is done in the controller 7. The controller 7 then commands the operation of the injection pump or the electromagnetic device 5 by a program stored in the controller 7.

Operation of the first embodiment of this invention will be described below.

During the injection step of the engine, connection hole 31 is closed by the control valve 4, and air flows into the cylinder from the inlet valve. Then during the compression step of the engine, the air in the cylinder is compressed by the piston, and during the last period of compression step, the electromagnetic device 5 operates valve 4 which opens connection hole 31.

Before the connection hole 31 is opened, fuel has been injected by the injection nozzle 6 to the pre-chamber 3. The fuel in the pre-chamber 3 is activated by exhaust gas which remains in the pre-chamber 3.

The connection hole 31 is opened by the control valve 4 at the last period of compression step, compressed and hot air is forced into the pre-chamber 3. The activated fuel is mixed with the air and is burned by the hot air, but the fuel in the pre-chamber is so rich that the generation of NOX is controlled.

Afterwards, the non-burned fuel and the flame generated in pre-chamber 3 is ejected to main chamber 12, and fuel and hot air in the main chamber 12 are reacted, then combustion ends. Therefore, the supplied fuel smoothly burns in the cylinder even if the compression ratio of the engine is raised.

Although one of the embodiments is explained above, this invention is not limited to that embodiment. For instance, a camshaft or a cogwheel device can be used as driving means of the control valve.

Figure 2:
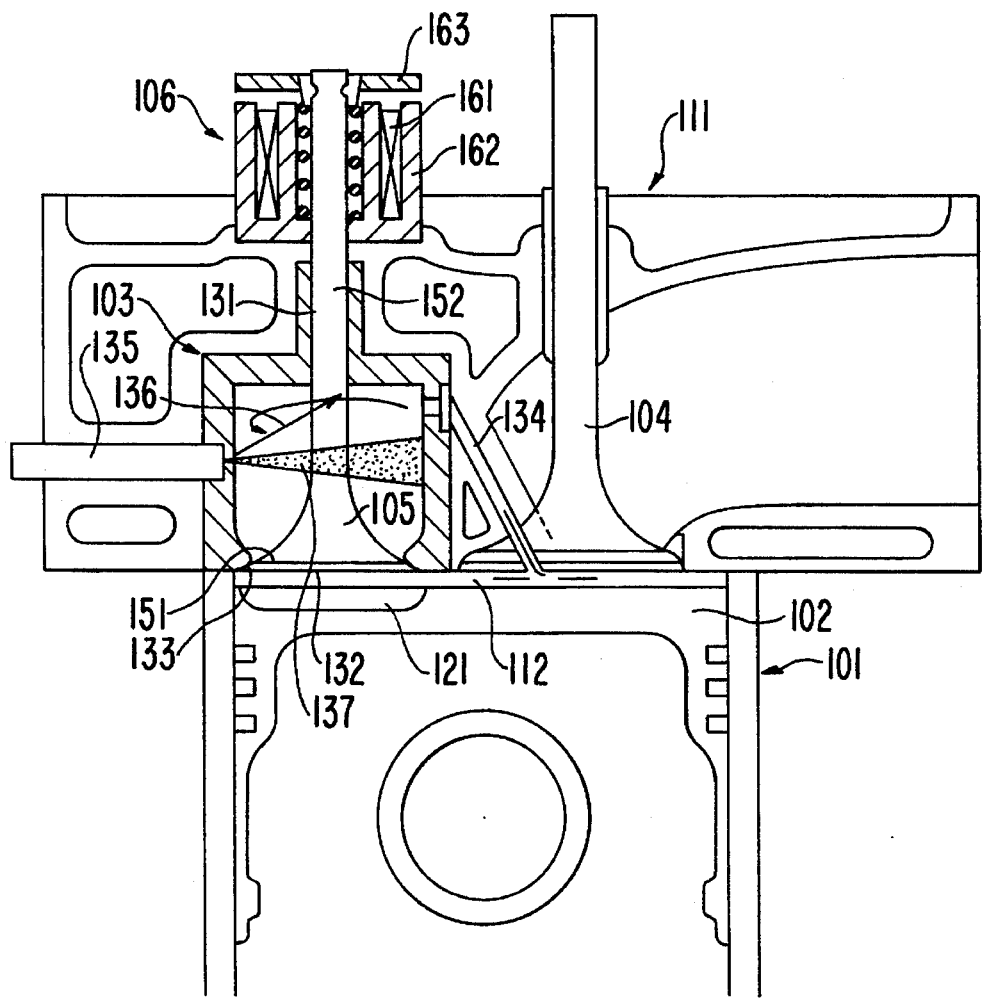
FIG. 2 is a fragmentary cross-sectional view of the second embodiment of this invention.
Figure 3:
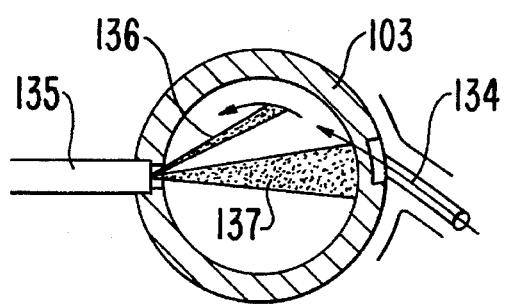
FIG. 3 is an explanatory drawing by which the state of the vaporization of the fuel injected to pre-chamber in the second embodiment of this invention may be understood.

FIG. 2 is a fragmentary cross-sectional view of the second embodiment of this invention, and FIG. 3 is an explanatory drawing by which the state of the vaporization of the fuel ejected for prechamber in the second embodiment of this invention.

In the FIG. 2 and FIG. 3, the cylinder 101 has a piston 102 slidably moved in the cylinder 101. There are provided pre-chamber 103 as a precombustion chamber and inlet valve or exhaust valve 104 in the cylinder head 111.

The material which composes pre-chamber 103 is ceramic with high strength and heat resistance.

Control valve 105 for instance made with silicon nitride ceramic is installed in a central part of pre-chamber 103.

Connection passage 132 connected with main chamber 112 is formed in a central part of pre-chamber 103, and control valve 105, which opens and closes the connection hole 132, is installed on the connection passage.

Stem 152 of this control valve 105 is slidably supported in an axis hole 131 which penetrates through a central upper part of the wall of pre-chamber 103. Therefore this control valve 105 can move vertically in the direction of the axis of stem 152.

Electromagnetic device 106 which has coil 161 and yoke 162 arranged on access hole 131.

Adsorption board 163 is installed on the upper part of stem 152 of control valve 105.

When an electric current is applied to coil 161 and yoke 162 adsorbs adsorption board 163 downward, control valve 105 opens connection hole 132.

A connection passage 134 penetrates through cylinder head 111 into the upper part of main chamber 112 and is connected with the upper part of pre-chamber 103. That is, this connection passage 134 is a sub-passage where air is connected between main chamber 112 and pre-chamber 103.

The sectional area at connection passage 131 is about 0.3% to 0.7% area at connection hole 132 under pre-chamber 103 for instance. And, when air of main chamber 112 is compressed in the compression stroke of the engine, the compressed air is led to prechamber 103 through connection passage 134. The air led to pre- chamber 103 by the connection passage 134 is mixed with vapor sub-stream 136 injected by injection nozzle 135, then fuel begins burning.

The pressure in the pre-chamber rises because of the expansion of the gas by the combustion of the injected fuel. This rising pressure assists the force opening the control valve 105, and burning expand from vapor sub-stream 136 to main vapor stream 137.

After that the control valve 105 is opened and fuel gas expands into main chamber 112.

Next, the operation of the second embodiment of the invention is explained below.

Air in cylinder 101 is compressed in the compression step of the engine and a part of this compressed air is led to pre-chamber 103 through connection passage 134.

The air led to the pre-chamber 103 generates an eddy in the upper part of pre-chamber 103. And the eddy is mixed with subatomization 136 injected by injection nozzle 135, then fuel begins burning. Thus increasing pressure assisting the power generated by the electromagnetic device 106 to open the control valve 105, and the burning expands from vapor sub-stream 136 to the main vapor stream 137.

After that the control valve 105 is opened and fuel gas expands to main chamber 112. The expanding fuel gas is well mixed with the compressed air in the main chamber including the air in the hollow part 121, then burning explosively. The power of the burning pushes the piston 102 and generates high engine torque.

Next, the third embodiment of this invention is explained in detail by using the drawings.

Figure 4:
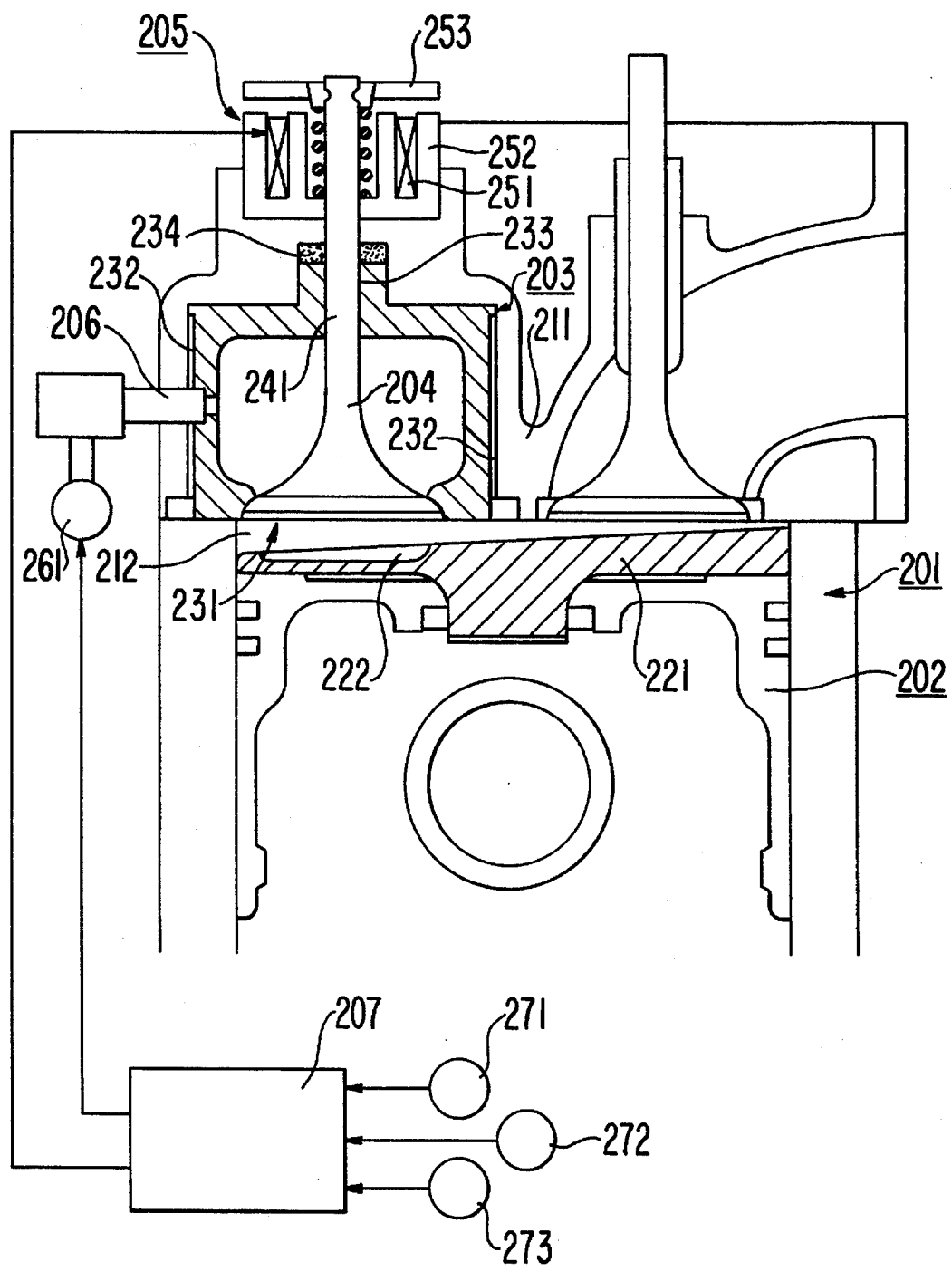
FIG. 4 is a fragmentary cross-sectional view of the third embodiment of this invention.
Figure 5:
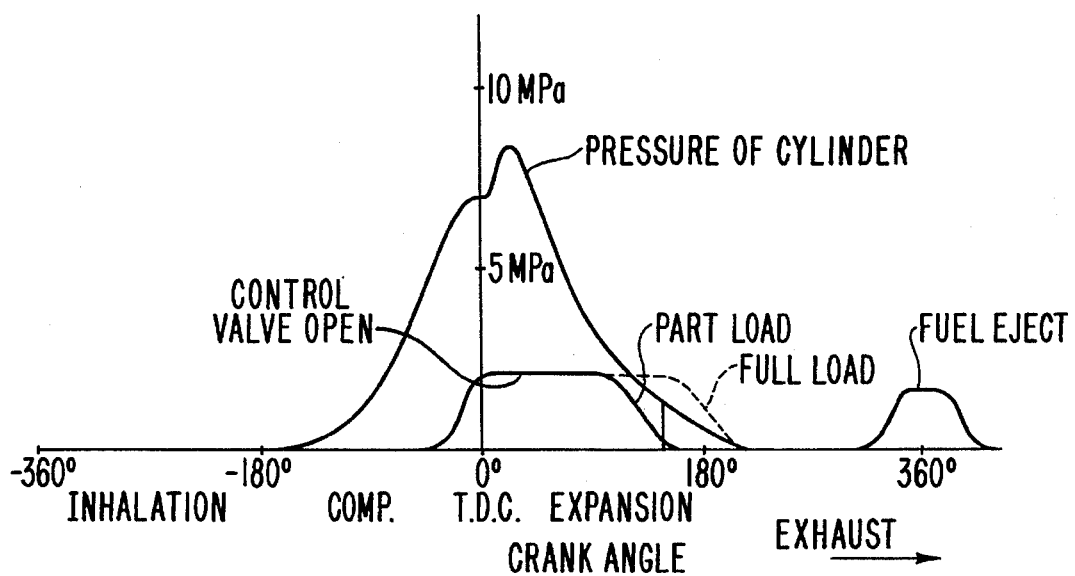
FIG. 5 is an explanatory drawing by which the motion of the engine according to the third embodiment of this invention may be understood.

FIG. 4 is a fragmentary cross-sectional view of the third embodiment of this invention, and FIG. 5 is an explanatory drawing by which the state of the motion of the engine according to the third embodiment of this invention.

In the FIG. 4, 201 denotes a cylinder and the cylinder 201 has a piston 202 which can be moved up and down within this cylinder 201. There is installed an inlet valve or an exhaust valve 204 and pre-chamber 203 which becomes pre combustion chamber in cylinder head 211. And, the material which composes piston head 221 is ceramic which has heat resistance and high strength. A slope is formed on the piston head 221 and under part of the pre-chamber is formed lowest. The slope is shallowly formed while going away from the portion under the pre-chamber. There is a hollow part 222 on the slope of piston head 221. The hollow part 222 operates as an accumulator of air.

The pre-chamber 203 consists of a high strength, heat resistant, and heat insulative material; for example, silicon nitride.

Air layer 232 of heat insulation is formed on the outer wall of pre-chamber 203, connection hole 231 connected with main chamber 212 is formed in a central part of pre-chamber 203, and control valve 204 which opens and closes the connection hole 231 is installed on the connection hole.

Stem 241 of this control valve 204 is slidably supported in an axis hole 233 which penetrates through a central upper part of the wall of pre-chamber 203. Therefore this control valve 204 can move vertically in the direction of the axis of stem 241.

A heat insulation material 234 is installed above axis hole 233 and heat in pre-chamber is prevented from running away from step 241 of control valve 204.

An electromagnetic device 205 is installed above stem 241 for opening and shutting control valve 204.

When the electric current is applied to coil 251 of this electromagnetic device 205, core 252 is pulled down to adsorption board 253 installed on stem 241 and moves control valve 205 below. And, control valve 203 opens connection hole 231 of pre-chamber 203. 206 denotes an injection nozzle 203. The injection nozzle 206 is installed on the sidewall of pre-chamber 203. The fuel sent from a fuel tank is injected from injection nozzle 206 into prechamber 203.

The fuel injection instruction of this fuel injection pump 261 is commanded by controller 207. The controller 207 comprises a microcomputer. The detection signal from rotation sensor 271, load sensor 272, and crank axis position sensing device 273 of the engine is input to the controller 207. When these detection signals are input to controller 207, a fixed operation is done in the controller 207. And the controller 207 commands the operation for injection pump or electromagnetic device 205 by a program stored in the controller 207.

Next, the operation of the third embodiment of the invention is explained below using the FIG. 5 explanatory drawing by which the state of the motion of the engine.

Last period of compression step, the electromagnetic device 205 is operated, then connection hole 231 is opened by the valve 204.

Before the connection hole 231 is opened, methanol fuel is injected by the injection nozzle 206 to the pre-chamber 203. The methanol fuel in the pre-chamber 203 is activated by remaining exhaust gas in the pre-chamber 203 and methanol fuel $CH_3$ OH decomposed to $2H_2+CO$.

The connection hole 231 is opened by the control valve 204 at the last period of compression step near the top dead center point, compressed and hot air is forced into the pre-chamber 203. The activated methanol fuel is mixed with the air and is burned by the hot air, but the fuel in the pre-chamber is so rich that the generation of NOX is controlled.

Afterwards, the non-burned fuel and flame generated in prechamber 203 is ejected to main chamber 212, and methanol fuel and hot air in the main chamber 212 are reacted, then combustion ends. Therefore, the supplied fuel smoothly burns in the cylinder even if the compression ratio of the engine is raised. Therefore, excellent combustion can be achieved even at a partial load.

As for the temperature of the main combustion chamber, when the engine operates under a high load, the fuel ignites easily even if the control valve is opened as shown in FIG. 5. This is shown on the line from the end of the compression step past the expansion step. Enough combustion takes place because of a higher temperature than the temperature at a partial load.

What is claimed is:

1. A high compression ratio internal combustion engine for burning vaporized hydrocarbon fuels including gasoline and methanol comprising:

a pre-chamber;

a main chamber;

a barrier between said pre-chamber and said main chamber defining a passage hole therebetween;

a control valve located in said passage hole having an opened and a closed state for opening and closing said passage hole;

a driver for changing said control valve between the opened and closed state;

an injection nozzle for injecting a fuel to said pre-chamber;

means for controlling said control valve to close during the exhaust stroke and intake stroke and to open during the last stage of the compression stroke; and means for controlling said injection nozzle for injection of a fuel to said pre-chamber from the end of said exhaust stroke to the beginning of said intake stroke.

2. A high compression ratio internal combustion engine according to claim 1, further comprising a heat insulation layer behind said pre-chamber.

3. A high compression ratio internal combustion engine according to claim 1, wherein said pre-chamber is formed from ceramic materials having at least thermal stability.

4. A high compression ratio internal combustion engine according to claim 1, wherein the compression ratio is between 18 and 23.

5. A high compression ratio combustion engine comprising:

a pre-chamber;

a main chamber including a piston;

a barrier between said main chamber and said pre-chamber defining a passage hole therebetween, said passage hole having a cross-sectional area equal to 3 to 5% of the cross-sectional area of the piston;

a control valve located in said passage hole having an opened and a closed state for opening and closing said passage hole;

a driver for changing said control valve between the opened and closed state;

an injection nozzle for injecting a fuel to said pre-chamber;

a connection passage which connects between an upper part of the pre-chamber and the main chamber;

means for controlling said control valve to close during the exhaust stroke and the intake stroke and to open during the last stage of the compression stroke; and means for controlling said injection nozzle for injecting a fuel to the pre-chamber when said control valve is closed.

6. A high compression ratio internal combustion engine according to claim 5, wherein the connection passage is coupled to the pre-chamber via an opening in a side wall of said pre-chamber, wherein said connection passage has a sectional area 0.3% to 0.7% of said passage hole's sectional area.

7. A high compression ratio internal combustion engine according to claim 6, wherein the barrier between said pre-chamber and said main chamber is a cylinder head; and said connection passage is located in said cylinder head.

8. A high compression ratio internal combustion engine comprising:

a pre-chamber;

a main chamber;

a barrier between said pre-chamber and said main chamber defining a passage hole therebetween;

a control valve located in said passage hole having an opened and a closed state for opening and closing said passage hole;

a driver for changing said control valve between said opened and said closed state;

an injection nozzle for injecting a fuel to said pre-chamber;

means for detecting engine load;

means for controlling said control valve, driven by an electro-magnet system, to open during the last stage of a compression stroke;

means for controlling said control valve such that the control valve is closed during an expansion stroke in response to said signal from the means for detecting engine load; and means for controlling said injection nozzle for injecting a fuel to the pre-chamber when said control valve is closed.

9. A high compression ratio internal combustion engine according to claim 8, wherein said engine's fuel is methanol.

10. A high compression methanol engine, comprising:

a control valve to open-and-close a communication bore between an antechamber for precombustion of methanol as fuel for the engine and a main chamber;

an electromagnet to open-and-close said control valve by means of electromagnetic force;

an antechamber temperature control means for keeping an inner temperature of the antechamber at a high degree;

a load detecting means for detecting load of the engine;

and a valve open-and-close control means for opening said control valve in a compression stroke of the engine and for closing said control valve in an explosion stroke in accordance with signals from said load detecting means.

11. The high compression methanol engine according to claim 10, wherein said valve open-and-close control means is adapted to close the valve earlier in a partial load state than in a full load state upon signals from said load detecting means.

12. The high compression methanol engine according to claim 10, wherein said antechamber temperature control means is provided with the antechamber made of ceramics having high-strength, high temperature properties and low-thermal conductivity, the outside wall of which has an air buffering area for blocking off heat.

* * * * *

UNITED STATES PATENT AND TRADEMARK OFFICE
CERTIFICATE OF CORRECTION

PATENT NO. : 5,603,298
DATED : February 18, 1997
INVENTOR(S) : Hideo KAWAMURA

It is certified that error appears in the above-indentified patent and that said Letters Patent is hereby corrected as shown below:

TITLE PAGE [75] Inventor

"Samukawa-machi" should be --Kanagawa--.

TITLE PAGE [57] ABSTRACT

Line 10, "t he" should be --the--.

Column 6

Line 52, "compression" should be --expansion--;

Line 53, "expansion" should be --compression--.

Column 7

Line 21, "ratio combustion" should be --ratio internal combustion--.

Signed and Sealed this

Twenty-fifth Day of November, 1997

Attest:

BRUCE LEHMAN

Attesting Officer

Commissioner of Patents and Trademarks